(No Model.) 2 Sheets—Sheet 2.
N. M. LANGDON.
APPARATUS FOR GENERATING GAS.
No. 263,921. Patented Sept. 5, 1882.
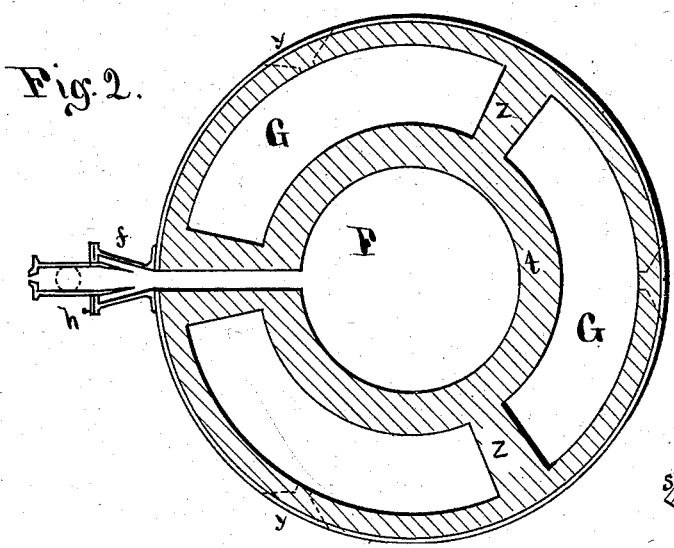
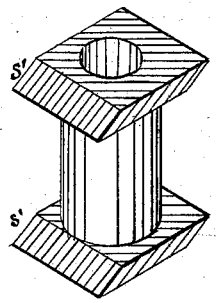
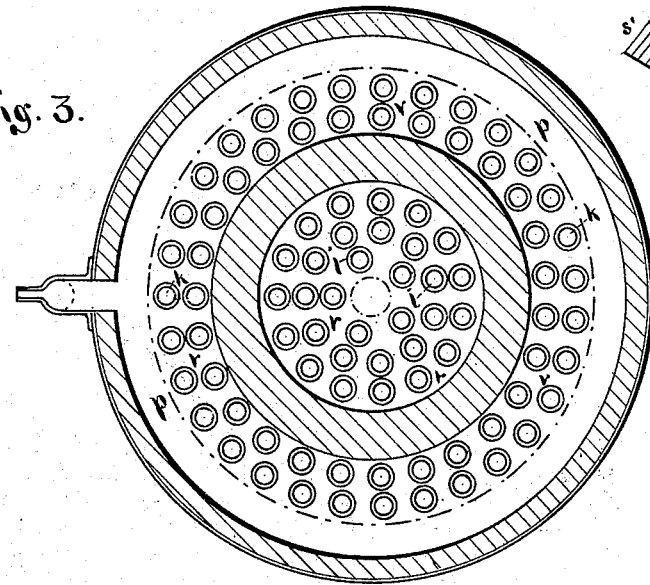
Witnesses:
Geo. D. Seymour
Herman Moran
Inventor
N. M. Langdon
by N. A. Seymour
Atty.

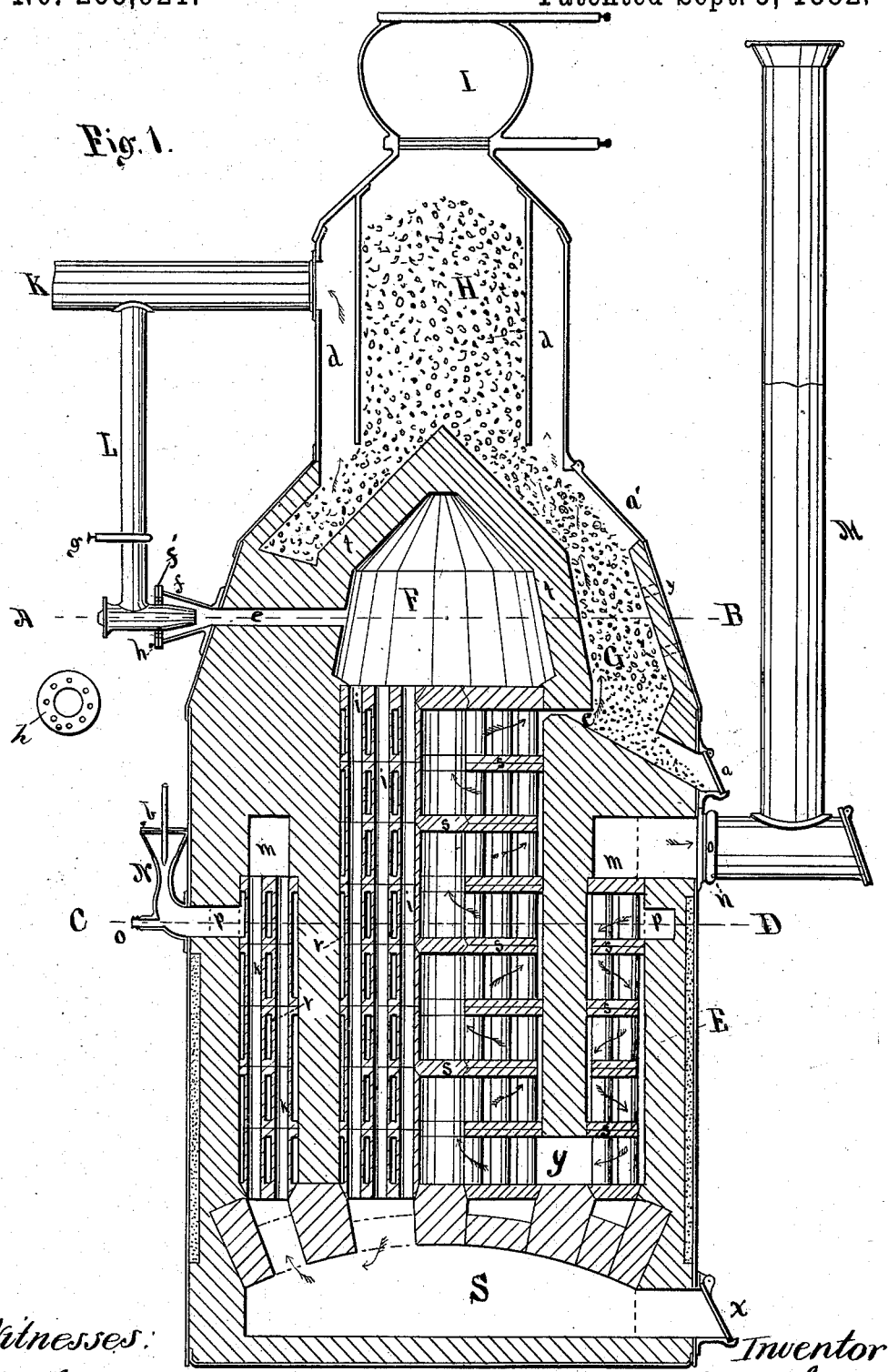

UNITED STATES PATENT OFFICE.

NELSON M. LANGDON, OF CHESTER, NEW JERSEY.

APPARATUS FOR GENERATING GAS.

SPECIFICATION forming part of Letters Patent No. 263,921, dated September 5, 1882.

Application filed November 22, 1881. (No model.)

*To all whom it may concern:*

Be it known that I, NELSON M. LANGDON, of Chester, in the county of Morris and State of New Jersey, have invented certain new and useful Improvements in Apparatus for Generating Gas; and I do hereby declare the following to be a full, clear, and exact description of the invention, such as will enable others skilled in the art to which it pertains to make and use the same.

My invention relates to an improvement in processes of and apparatus for the generation of a combustible gas by the decomposition of steam in incandescent carbonaceous fuel.

The object of my invention is to maintain the fuel in a state of normal incandescence without interrupting the generation of gas and without the admission to it of air in deleterious quantities.

A further object of my invention is the employment of a portion of the gas generated in sustaining the fuel in a state of normal incandescence and in highly superheating the steam before its introduction into the generating-chamber.

A further object of my invention is the utilization of pulverulent carbonaceous solids as the agent for decomposing the steam and for supplying the carbon element of the gas.

It is well known that when steam is passed through a mass of incandescent carbonaceous matter it is decomposed into its constituent elements of hydrogen and oxygen, which become carburized by combining with some of the carbon of the incandescent matter and produce gases not only highly inflammable, but also of great thermic power. Owing, however, to the great amount of heat taken up in the decomposition of the steam, the temperature of the fuel is soon lowered below that point at which the dissociation is effected and the generation of the gas is discontinued.

The different processes and apparatus employed in the conversion of steam into an inflammable gas may be classified as the "intermittent" and the "continuous." The intermittent process consists in passing steam through a mass of incandescent fuel until the temperature thereof is reduced below that point at which the decomposition of the steam is effected, and in shutting off the steam and restoring the incandescence of the fuel by the admission of atmospheric air thereto. Steam and air are thus alternately admitted to the fuel and the production of the gas is intermittent. To generate gas continuously by this process two independent sets of apparatus are necessary, the one producing gas while the incandescence of the fuel in the other is being restored. This double system of generating the gas greatly increases the expense of production, and for this reason the intermittent process is objectionable. In the so-called "continuous process" the gas is produced uninterruptedly by the admission to the fuel and with the steam of a sufficient quantity of air to maintain the incandescence of the fuel. This process, however, is objectionable on account of the admixture with the gas of the nitrogen of the air, which, being non-combustible, acts as a diluent and interferes with the combustion of the gas. It has also been sought to maintain the incandescence of the fuel without the admission to it of air, and thus obtain a pure water-gas by the sensible heat to be obtained from highly superheated steam; but owing to the limitation of the temperature to which the fusibility of the mineral or ash contained in the fuel the heat supplied by a given volume of steam has proven inadequate to maintain the fuel at a temperature sufficiently intense to effect its dissociation.

My invention consists in the construction of an improved apparatus designed to employ the heat of conduction and radiation derived from combustion within a chamber independent of and rising within the generating-chamber and the sensible heat of superheated steam in maintaining the normal incandescence of the fuel.

In the accompanying drawings, Figure 1 is a view in vertical central section of my improved gas-generator. Fig. 2 is a view in horizontal section through line A B of Fig. 1. Fig. 3 is a similar view through line C D of the same figure, and Fig. 4 is a view of one of the tubes of the superheater.

My improved apparatus or generator consists substantially of a generating-chamber wherein steam is decomposed by incandescent carbonaceous fuel, of a combustion-chamber located below but rising within the generating-chamber, from which it is separated by thin walls, and of a superheater in which the steam is highly heated before its introduction into the generating-chamber by heat derived from the combustion of gas in the combustion-chamber.

G represents the generating-chamber, into which fuel is introduced from a supply-chamber, H, located above it. The said supply-chamber is provided with a hopper, I, through which it is filled. The chamber G is subdivided in smaller chambers by radial piers $z$, the inner ends of which abut against the walls $t$ of the combustion-chamber F. Doors $a$ and $a'$, located in the outer walls of the chamber G, provide access thereinto for the purpose of cleaning it and also of igniting the fuel. The walls of the said chamber are pierced by orifices $y$, having enlarged outer ends. These orifices are designed to permit the fuel to be manipulated by rods or pokers, thus avoiding the admission to it of atmospheric air, which would result if the doors $a\ a'$ were opened for this purpose. The gas generated in the chamber G ascends into the flue or chamber $d$, from which it is conveyed to a suitable storage-reservoir through pipe K. A portion of the gas passed through the pipe K is intercepted by the pipe L and conveyed into the combustion-chamber F, which rises within the generating-chamber G. The combustion and generating chambers are separated one from another by inclined walls $t$. These walls converge and form a cone-shaped point, which extends upwardly and equalizes the distribution of fuel throughout the generating-chamber as it descends from the supply-chamber H. Gas is introduced into the said combustion-chamber by means of an orifice or conduit, $e$, the outer end of which is provided with a jet-burner, $f$, adapted to receive the angled lower end of the pipe L. The quantity of gas burned is regulated by the damper $g$, while the amount of air admitted through the annulus $f'$ around the burner $f$ to support the combustion of the gas is regulated by the damper $h$. The heat derived from the combustion of gas and air in the combustion-chamber is imparted to the fuel by conduction through and radiation from the walls $t$. The shape of the chamber is designed with especial reference to exposing the greatest possible area of heating and radiating surface to the fuel in the generating-chamber for the purpose of realizing the maximum effect of the heat generated by the burning gas.

The heat generated in the combustion-chamber is employed in another way to sustain the normal temperature of the fuel. This consists in superheating the steam by it before the same is introduced into the generating-chamber. When the steam so heated enters the said chamber it will impart its sensible heat to the fuel. The steam is superheated in a superheating device located below the combustion-chamber, and consisting of a series of sectional tubes through which the products of the combustion of gas in the chamber F are passed, and of a series of passages through which the steam is passed on its way to the chamber G. A series of tubes, $i$, communicating with the combustion-chamber, extend downwardly and open into the chamber S. These tubes are made in sections, one of which is shown in detail in Fig. 4 of the drawings, each section being provided at each end with right-angled flanges $s'$, which form, when the tubes are in position, a series of diaphragms, which deflect the steam in a tortuous course, as shown by the arrows, in its passage to the chamber G. The intensely hot products of combustion, consisting of burning gases and smoke, descend from the combustion-chamber through the tubes $i$ and enter the closed chamber S, from which they are deflected to a series of tubes, $k$, of the same character as the tubes $i$, but located in an annular chamber surrounding the system of tubes and passages located directly under the combustion-chamber. From the tubes $k$ the hot products of combustion enter the circular passage or flue $m$, from which they are discharged through the stack M, which is provided with a damper, $n$, to regulate such discharge. As soon as the superheater has become intensely heated by the passage through it, as described, of the hot products of combustion, steam generated in any desired manner and under pressure is admitted to the annular passage $p$ of the superheater through the pipe $o$. From the said passage the steam flows through the passages $v$ in a reverse direction from that taken by the hot products of combustion in their transit through the tubes $i$ and $k$. After passing through the passages of the outer chamber of the superheater the steam enters the central chamber thereof through the passage lettered Y. Rising through this chamber in the direction indicated by the arrows, the steam, now highly superheated, will escape into the generating-chamber through the narrow flue $c$. After entering the said chamber it will be decomposed by the action of the incandescent fuel into its constituent elements—hydrogen and oxygen, the latter combining with the carbon of the fuel to form carbonic oxide. These gases will ascend into the flue or chamber $d$, from which they are conveyed to any suitable reservoir by the pipe K. In this manner the heat of conduction and radiation derived from the combustion of gas in a central combustion-chamber and the sensible heat derived from steam superheated from the same source is applied to the maintenance of the fuel in its normal condition of incandescence—a result which is effected very economically, as the heat necessary thereto is derived from the combustion of a portion of the gas generated and as the operation is continuous.

For the purpose of supplying a small quantity of oxygen to the fuel in the generating-chamber to support combustion, it is sometimes desirable to admit air thereinto. With this end in view provision is made therefor in the steam-jet blower N, which is provided with the regulating valve or damper $b$. When desired, air compressed in any desired manner may be forced into the blower and passed through the superheater with the steam. After the air has passed through the superheater, and when it reaches the generating-chamber, it is intensely heated, and therefore, by imparting a portion of its sensible heat to the fuel, assists in a twofold way in maintaining its incandescence.

The chamber S is provided with a door, $x$, to permit it to be cleaned of the sooty accumulations which are deposited therein by the smoke from the burning gas in the chamber F.

The generator or apparatus will be chiefly constructed of iron and fire-clay, or of any equivalent materials. The different tube-sections of the superheater are formed of fire-clay or other material adapted to resist intense and long-continued heat.

Having described the construction of my apparatus and set forth the particular functions of its different parts, I will now briefly set forth its *modus operandi*:

It is first necessary to heat the superheater. This is effected, when the apparatus is in full working order, by the combustion of water-gas; but until the apparatus is started air-gas may be employed. The generating and supply chambers having been filled with fuel, wood or other light combustible material previously introduced into the bottom of the chamber G is ignited through the doors $a$. As soon as the fuel is well ignited a blast of air and steam is admitted into the superheater through the blower N. After traversing the passages V it escapes into the generating-chamber G, and, rising through the ignited fuel, forms a combustible gas, which rises into the flue $d$ and passes thence into the pipe K, from which it is conveyed through pipe L to the combustion-chamber F, where it is ignited. The intensely-heated products of combustion of this gas will escape through the tubes of the superheater and raise them to a very high temperature. As soon as the superheater has been raised to the desired temperature the air-blast is turned off and steam only is admitted into the superheater through the inlet $o$, in its passage through which it becomes highly superheated. Entering the generating-chamber through the orifice or passage $c$, the steam imparts its sensible heat to the incandescent fuel, by which it is decomposed into its constituent elements of hydrogen and oxygen, the latter combining with the carbon of the fuel to form carbonic oxide. These gases will ascend into the flue $d$, from which they will enter the pipe K. The pipe L will intercept a portion of the gases so generated and convey them to the combustion-chamber F, when they are burned to sustain the incandescence of the fuel in the generating-chamber by the heat of conduction and radiation, and by the heat absorbed by the steam in passing through the superheater. From the point where the water-gas is burned in the combustion-chamber the action of the apparatus may be said to be continuous.

Any suitable carbonaceous fuel may be employed; but my apparatus is especially adapted to utilize the slack or culm accumulations of coal-mines, peat, sawdust, and in fact all pulverulent carbonaceous substances, which it has been possible to use heretofore only in limited quantities, owing to their tendency to pack and prevent the passage of steam, air, or gas through them. By forcing the steam and air into the fuel under pressure this objection is surmounted. It is the utilization of this pulverulent material, hitherto almost without use, that constitutes one of the most important economical features of my improved gas-generating system. It is apparent that, aside from those changes which must often be made to meet the requirements caused by the oscillation of the ordinary practical conditions, other changes and alterations may be made in my apparatus without departing from the spirit and scope of my invention.

Having fully described my invention, what I claim as new, and desire to secure by Letters Patent, is—

1. In an apparatus for generating water-gas, the combination, with a closed generating-chamber having means for feeding solid carbonaceous fuel and steam into it, and provided with a gas-eduction pipe, of a closed combustion-chamber located below and rising within the generating-chamber, and provided with means for the introduction of fuel and for the egress of the waste products of combustion, substantially as set forth.

2. In an apparatus for continuously generating water-gas, the combination, with a generating-chamber, of an independent combustion-chamber located below the generating-chamber, from which it is separated by a thin wall, of a superheater connected with and heated by heat derived from combustion within the independent chamber.

3. In an apparatus for continuously generating water-gas, the combination, with a generating-chamber, of an independent combustion-chamber located below and rising within the generating-chamber, from which it is separated by a thin wall, and provided with air-inlets, gas-conduits leading from the generating to the independent combustion chamber, and devices to regulate the amount of air and gas passing through said conduits and inlets.

4. In an apparatus for continuously generating water-gas, the combination, with a generating-chamber, of a combustion-chamber located below and rising centrally within the generating-chamber, from which it is separated by a conical wall, and a superheater located below the combustion-chamber and provided with a series of flues or tubes in communication with the combustion-chamber and with an exit-stack, and with passages formed between said flues or tubes, and communicating with steam and air inlet pipe, and with the generating-chamber, substantially as set forth.

5. In an apparatus for continuously generating water-gas, the combination, with a generating-chamber, of a combustion-chamber located below and separated from it by a thin wall, and devices for conveying a portion of the gas generated to the combustion-chamber, substantially as set forth.

6. In an apparatus for continuously generating water-gas, the combination, with a generating-chamber, of a combustion-chamber located below and rising within it, and a superheater consisting of sectional flanged tubes located in chambers situated below the combustion-chamber, and arranged to form flues to convey away the hot products of the combustion of gas in the combustion-chamber, and passages to convey steam or air tortuously between said flues, and to finally introduce it into the generating-chamber, substantially as set forth.

In testimony whereof I have signed this specification in the presence of two subscribing witnesses.

NELSON MILTON LANGDON.

Witnesses:
  F. N. JENKINS,
  W. V. NICHOLS.